United States Patent [19]

Barr

[11] Patent Number: 4,640,554
[45] Date of Patent: Feb. 3, 1987

[54] VALVE ASSEMBLY FOR USE IN BRAKE PRESSURE CONTROL UNIT

[76] Inventor: William A. Barr, Gibson Island, Md. 21056

[21] Appl. No.: 849,269

[22] Filed: Apr. 8, 1986

Related U.S. Application Data

[62] Division of Ser. No. 659,897, Oct. 12, 1984, abandoned.

[51] Int. Cl.⁴ .............................................. B60T 8/26
[52] U.S. Cl. .................................................. 303/6 C
[58] Field of Search ............... 188/349; 303/6 C, 6 R, 303/22 R, 84 R

[56] References Cited

U.S. PATENT DOCUMENTS

| 4,213,655 | 7/1980 | Brademeyer | 303/6 C |
| 4,274,518 | 6/1981 | Berisch | 303/6 C |

*Primary Examiner*—Duane A. Reger
*Attorney, Agent, or Firm*—Scrivener and Clarke

[57] ABSTRACT

The invention overcomes the problem of a cocking valve in a pressure control unit for use in a vehicle braking system. The valve is provided with a body assembly defining an external cylindrical surface slidably engaging the internal surface of a valve chamber, the engaged cylindrical surfaces having sufficient axial extent as to positively prevent said valve from cocking or moving laterally out of a co-axial position with a movable valve seat.

4 Claims, 5 Drawing Figures

VALVE ASSEMBLY FOR USE IN BRAKE PRESSURE CONTROL UNIT

This is a division, of application Ser. No. 659,897, filed Oct. 12, 1984, now abandoned.

This invention relates to a brake pressure control unit for a vehicle brake system and more particularly to means for retaining a movable valve in said unit at all times co-axial with a movable valve seat in the unit.

The braking system of certain vehicles now in manufacture includes disc brakes on the front wheels and shoe drum brakes on the rear wheels. A dual master cylinder is operated by a single pedal with each chamber of the master cylinder delivering fluid to a front disc brake on one side of the vehicle and to a rear drum brake on the opposite side of the vehicle, such a braking configuration being known as an X system. Because drum and disc brakes call for different pressures it is necessary to proportionately reduce the pressure at the drum brakes relative to pressure at the disc brakes for any given pedal effort in excess of a predetermined low value. This reduced pressure is achieved by control units each comprising a proportioning valve between each master cylinder chamber and a rear brake; that is to say there must be two such valves in an X-configuration braking system. In one X-system, the control unit comprises a stepped piston slidable in a stepped bore in the unit with the larger step being adjacent the outlet. An axial passage extends through the piston and at its smaller end there is a valve seat co-axial with the bore. Between the inlet and the smaller bore is a valve chamber with a valve nominally retained in co-axial relationship with the valve seat by four radial vanes which slidably engage the cylindrical wall of the valve chamber. A shoulder is provided between the chamber and bore and a light conical spring biases the vanes in the direction of the shoulder which limits the movement of the valve towards the smaller bore. When the pressure force acting on the larger diameter end of the piston exceeds the pressure force acting on the smaller diameter end plus the bias of a spring, the piston moves in the direction of the inlet until the valve seat engages the valve whereupon further flow through the axial passage is cut-off and not resumed until the pressure at the inlet rises to a value overcoming the opposing force at the outlet whereupon the piston is moved in the opposite direction to open the valve, with this process continuing so long as the inlet pressure continues to rise, with the outlet pressure being always proportionately less than the inlet pressure.

After careful study I have determined that the configuration of the valve and its vanes is such that under certain conditions the valve can become cocked or at least can be moved so that it is no longer co-axial with the valve seat, and when, under this condition, the brake pedal is suddenly depressed, as can happen in a panic, when the piston moves towards the inlet, the valve never properly seats and instead of proportioning the pressure to one rear brake, that brake receives full pressure through the inoperative proportioning valve while the other rear brake receives proportioned pressure through its still-operative valve. Upon this occurrence, the non-proportioned brake can suddenly lock and, because sliding friction is substantially less than the static friction beneath a still-rolling wheel, the vehicle can suddenly skid, even on a dry road, in the direction of the locked wheel with the vehicle often unexpectedly presenting itself athwart the road in the path of oncoming traffic resulting frequently in serious accidents, severe injuries and often death.

The broad object of the present invention is to so construct the valve in the proportioning unit that the likelihood of its becoming cocked or moved out of its co-axial relationship with the valve seat is substantially eliminated.

More particularly, it is an object of the invention to redesign the valve so that it is unable to become cocked or otherwise displaced out of its co-axial relationship with the valve seat.

Yet another object of the invention is to accomplish the foregoing with minimum expense and, in one embodiment of the invention, with no changes in the unit other than the valve itself.

Other objects and their attendant advantages will become apparent as the following detailed description is read in conjunction with the accompanying drawings wherein.

Figure 1:
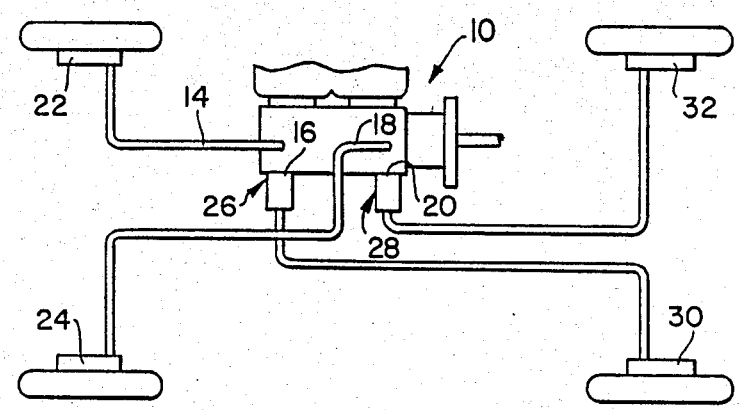
FIG. 1 is a schematic diagram of an X-configured braking system employing proportioning units for the rear brakes.

Referring now to FIG. 1, 10 designates a dual master cylinder each chamber of which has a pair of outlets 14, 16 and 18, 20. The outlets 14, 18 lead directly to the respective front brakes 22, 24 on opposite sides of the vehicle, and the outlets 16, 20 lead to the inlets of respective brake pressure control units 26, 28 whose outlets lead to the rear brakes 30, 32, it being apparent in FIG. 1 that the front chamber of the master cylinder 10 controls pressure to the right front wheel and the left rear wheel while the rear chamber controls pressure to the opposite two wheels.

Each control unit 26, 28 may be essentially the same as that disclosed in FIG. 7 of U.S. Pat. No. 4,213,655. Briefly the unit 26 includes an inlet 34 adapted to be connected to one of the outlets of one of master cylinder chambers and an outlet 36 adapted to be connected to a wheel brake cylinder. Within the unit is a stepped bore having a smaller portion 38 and larger portion 40 adjacent the inlet 34 and outlet 36, respectively, and a stepped piston 42, having an axial passage 44 therethrough, is received in said bore. A valve chamber 46 having a wall defining an internal cylindrical surface 47 is located in the unit between the end of the smaller stepped bore portion 38 and the inlet 34 and a valve seat 48 co-axial with the passage is provided in the end of the piston adjacent the valve chamber. A valve 50 extends towards the bore from the chamber 48 for engagement by the valve seat 48 to close the passage 44 in response to a pressure force acting across the greater step of the piston at the outlet which is in excess of the pressure force acting across the smaller step at the inlet plus the force of a biassing spring 52.

As can be seen the valve 50 includes an extension 53 projecting into the valve chamber and the cross-sectional dimension of the valve is less than the bore portion 38. The extension 52 has connected to it a plurality of radial vanes 56 which are biased into engagement with stop means, comprising a shoulder 58 between the valve chamber and bore, by an inverted conical spring 60 which bears at one end on the outer edges of the vanes and at the other end on a shoulder 61 adjacent the inlet 34.

In the prior art unit, the valve is a plastic moulding and due to manufacturing tolerances or because of wear the vanes do not always have a sufficiently close sliding fit with the cylindrical wall 47 of the valve chamber to ensure that after being moved upwardly by the piston 42 the valve returns to its proper co-axial position relative to the valve seat, and, in fact, the valve can become hung up in a cocked position in the valve chamber so that upon the next operation of the piston, which may be the result of a severe brake application under panic conditions, fluid at high pressure passes substantially unimpeded past the unclosed valve directly to that rear brake served by the unit to cause it to lock on, as above explained, resulting in a possible dangerous accident.

In accordance with the present invention this possiblity is reduced or eliminated by providing the valve with a supporting body assembly which includes means defining in cross-section an external cylindrical surface in close sliding engagement with the cylindrical internal wall surface 47 of the valve chamber, the engaged surfaces having an axial extent sufficient to prevent positively the body assembly and hence the valve from moving laterally or cocking with respect to the axis of the valve seat during sliding movement of the body assembly in the chamber.

The engaged cylindrical surfaces may have an axial extent substantially equal to the axial extent of the internal cylindrical wall or at least a major portion, that is, more than half, of the axial extent of the cylindrical wall part of the valve chamber in the unit.

Figure 2:
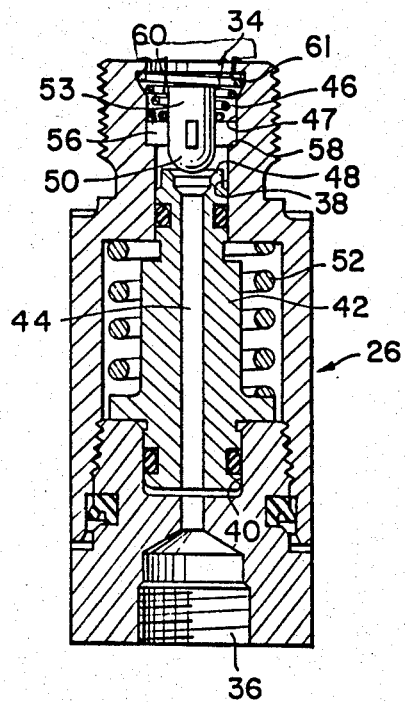
FIG. 2 is vertical cross-sectional view of a prior art unit presently in use in the system of FIG. 1.
Figure 3:
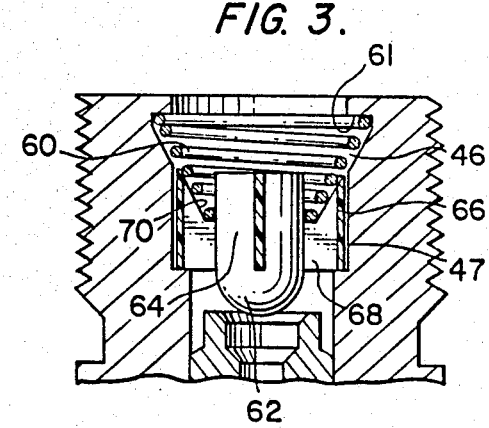
FIG. 3 is an enlarged vertical cross-sectional view illustrating a preferred embodiment of a valve assembly constructed in accordance with the invention for use in the unit of FIG. 2.
Figure 4:
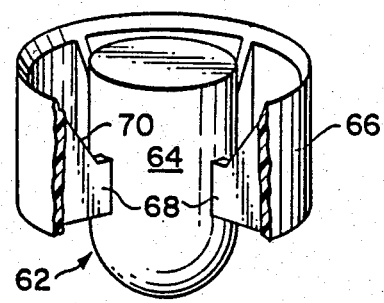
FIG. 4 is an enlarged broken, perspective view of the valve assembly of FIG. 3.

A preferred embodiment of valve and body assembly is illustrated in FIGS. 3 and 4 and because all parts except the valve and body assembly are identical to those in FIG. 2, they therefore have the same reference numerals. As can be seen, the valve 62 itself is substantially identical to the valve 50 in FIG. 2 and includes an extension 64 which extends co-axially into the valve chamber and is of less cross-sectional dimension than the chamber. The means defining the cylindrical external surface in the embodiment cf FIGS. 3 and 4 is a sleeve-like part 66 having an axial extent substantially equal to the extent of the cylindrical wall part 47 of the valve chamber. Interconnecting the internal surface of the sleeve-like member and the extension 64 of the valve are radial vanes 68 and because there must be free flow of fluid past the valve when in its open position the spaces between the vanes, the extension 64 and the inner surface of the sleeve define fluid flow passages.

As can be seen, the vanes 68 have co-extensive recesses 70 tapering in the direction of the valve 62 to receive one end of an inverted conical spring 60 whose opposite end engages an abutment defined by the shoulder 61 just as in FIG. 2. In order to avoid the necessity of changing any of the parameters of the unit of FIG. 2, except the valve and body assembly, the axial extent of the vanes below the recesses can be the same as the axial extent of the vanes 60 of FIG. 2. Thus there need be no change in construction of the conical spring over that of FIG. 2 so that those springs on hand or in the process of manufacture can continue to be used.

It will be apparent that the configuration of the valve and body assembly shown in FIGS. 3 and 4 can be achieved in a variety of ways, all within the purview of the invention. For example, instead of a sleeve like member and vanes interconnecting the member and the valve extension 64, the body assembly could be a solid moulded cylinder of substantially the same external dimension as the sleeve. The valve 62 would be moulded as a co-axial protuberance on the lower face of the cylinder, and molded or machined into the upper side of the cylinder would be an inverted conical recess surrounding a central part corresponding to the extension 64 of the valve which would, as in the embodiments of FIGS. 2 and 3, serve, with the wall of the recess, as a guide for the lower end of the spring. The fluid passages would be provided simply by vertical passages drilled through or molded in the body assembly between the valve 62 and the wall 47 of the chamber. Such passages might be molded in the external surface of the cylindrical body assembly and though the passages might even be defined by flutes in the body assembly, the external surfaces of the flutes must define sufficient external cylindrical surface as would be generated by a circle of substantially the diameter of the chamber so as to prevent the body assembly and hence the valve, at all times, from moving laterally or cocking with the respect to the axis of the chamber and valve seat.

Figure 5:
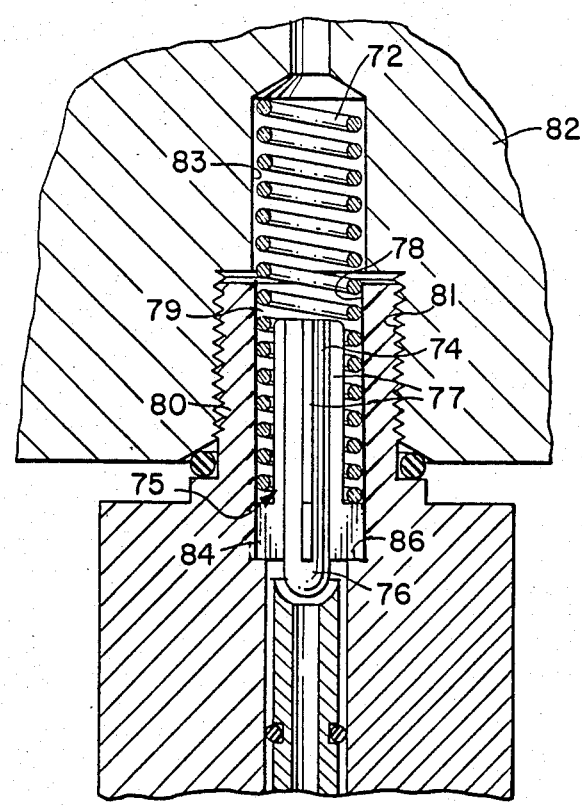
FIG. 5 is a vertical cross-sectional view of a second embodiment of the present invention.

FIG. 5 illustrates another embodiment of the invention which relies on the same principles as described in connection with the embodiments of FIGS. 3 and 4. In FIG. 5 the means defining in cross-section an external cylindrical surface comprises a sleeve-like member which may be in the form of the convolutions of a coiled member such as the spring 72 shown co-axially received over an integral extension 74 of the body assembly 75 which supports the valve 76. The extension has a plurality of pairs of diametrically opposed surfaces 77 spaced an equal distance radially inwardly from the cylindrical wall 78 of the valve chamber 79, which may be elongated over that shown in FIGS. 2 and 3 and may be formed by an elongated externally threaded neck portion 80 received in an elongated internally threaded bore portion 81 in the body of the master cylinder 82, the bore portion 81 joining a reduced diameter counter bore 83 for a purpose that will become apparent. The annular wall-like part of the sleeve-like element defined by the convolutions of the spring 72 has a thickness substantially equal to the spacing between the opposed surfaces 77 on the valve extension 74 and the chamber wall 78, to prevent the body assembly 75 and valve 76 attached thereto from moving laterally or cocking out of a position co-axial with the valve seat. The upper end of the spring is guidingly received in the counter bore 83.

As can be seen, the opposed surfaces can be on cut back upwardly projecting extensions of radial vanes 84 integral with the lower end of the valve extension 74 and having a cross-sectional extent substantially equal to the diameter of the valve chamber.

It will be apparent that instead of the spring convolutions which serve as a sleeve-like spacer guide, a continuous cylindrical sleeve could be provided. However by using the spring convolutions as the sleeve-like spacer the spring can also conveniently serve as the resilient means for biasing the valve assembly in the direction of the stop defined by the shoulder 86 between the valve chamber and smaller bore portion.

Though it will be apparent that the arrangement of FIG. 5 will require some alteration in dimensions of the unit over those shown in FIGS. 2 and 3, still, these changes will not be significant and considering the savings in lost sales, damages and the expense of litigation, the cost of the changes will be small indeed.

It will be apparent from the foregoing description that the invention is susceptible of a variety of changes and modifications without, however, departing from the scope and spirit of the appended claims.

What is claimed is:

1. In a brake pressure control unit for a vehicle brake system which unit includes an inlet adapted to be connected to a master cylinder and an outlet adapted to be connected to a wheel brake cylinder, said unit having a stepped bore, a stepped piston in said bore and including an axial passage communicating with said inlet and said outlet, a valve chamber in said unit between one end of said stepped bore and said inlet, said chamber having a cylindrical internal wall surface, a valve seat co-axial with said passage in said stepped piston and at the end thereof adjacent said valve chamber, and a valve extending towards said bore from said chamber for engagement by said valve seat to close said passage upon movement of said stepped piston towards said valve in response to opposing pressure forces acting on said piston, said valve having a cross-sectional dimension less than said bore and said valve chamber, the invention comprising means for retaining said valve at all times co-axial with said valve seat and comprising a part integral with said valve and extending co-axially into said valve chamber, said integral part being radially spaced inwardly from the wall of said chamber, a cylindrical sleeve-like element having an inner surface surrounding said integral part and an outer surface whose diameter is complementary to and in sliding engagement with the inner surface of said valve chamber, and means integrally joining the inner surface of said sleeve-like element and said integral part, said sleeve-like element having an axial extent which in cooperation with the inner surface of said valve chamber prevents said assembly and hence said valve from moving laterally or cocking with respect to the axis of said valve seat, and axial passageway means between said valve and the outer surface of said sleeve-like element for connecting said inlet and said bore.

2. In the unit of claim 1 wherein the means for integrally connecting said integral part and the inner surface of said sleeve-like element comprises vanes, the axial passageway means comprising the spaces between said vanes.

3. In the unit of claim 2 wherein said vanes have co-extensive recesses tapering in the direction of said valve, and said resilient means comprises an inverted conical spring having one end received in said recesses and its opposite end engaging abutment means in said chamber at the end thereof adjacent said inlet.

4. The unit of claim 1 wherein the engaged cylindrical surfaces extend over a major portion of cylindrical wall of said valve chamber.

* * * * *